United States Patent
Thom et al.

(10) Patent No.: US 11,792,013 B2
(45) Date of Patent: *Oct. 17, 2023

(54) CYBER PHYSICAL KEY

(71) Applicant: Microsoft Technology Licensing, LLC, Redmond, WA (US)

(72) Inventors: Stefan Thom, Snohomish, WA (US); David Thaler, Redmond, WA (US); Torsten Stein, Snohomish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/664,908

(22) Filed: May 25, 2022

(65) Prior Publication Data
US 2022/0407711 A1  Dec. 22, 2022

Related U.S. Application Data

(63) Continuation of application No. 15/703,857, filed on Sep. 13, 2017, now Pat. No. 11,374,760.

(51) Int. Cl.
*H04L 9/32* (2006.01)
*H04L 9/40* (2022.01)
(Continued)

(52) U.S. Cl.
CPC ............ *H04L 9/3234* (2013.01); *G06F 21/34* (2013.01); *G06F 21/62* (2013.01); *H04L 9/3263* (2013.01);
(Continued)

(58) Field of Classification Search
CPC . H04L 9/3234; H04L 9/3263; H04L 63/0853; H04L 63/10; H04L 63/0823; G06F 21/34; G06F 21/62
See application file for complete search history.

(56) References Cited

U.S. PATENT DOCUMENTS

| | | | |
|---|---|---|---|
| 7,506,381 B2 * | 3/2009 | Sormunen | G06F 21/575 713/1 |
| 7,711,960 B2 * | 5/2010 | Scarlata | H04L 9/0897 713/168 |

(Continued)

OTHER PUBLICATIONS

"Second Office Action Issued in Chinese Patent Application No. 201880041786.8", dated Aug. 10, 2022, 22 Pages.

(Continued)

*Primary Examiner* — Darshan I Dhruv

(57) ABSTRACT

A system manages access to an asset using a separate physical cryptographically-secure key device. A memory stores a public key as an unalterable record. An access configuration controller reads the public key from the memory to control the access to the asset. The public key is cryptographically paired with a private key securely recorded in the separate physical cryptographically-secure key device. The access configuration controller receives an access control change instruction signed by the private key and verifies a valid signing of the access control change instruction by the private key using the public key read from the memory. A storage system secured by the access configuration controller stores access authorization records managing access to the asset. The access configuration controller alters access authorization records according to the access control change instruction, responsive to verification of the valid signing of the access control change instruction.

20 Claims, 7 Drawing Sheets

(51) Int. Cl.
*G06F 21/62* (2013.01)
*G06F 21/34* (2013.01)

(52) U.S. Cl.
CPC .......... *H04L 63/0853* (2013.01); *H04L 63/10* (2013.01); *H04L 63/0823* (2013.01)

(56) References Cited

U.S. PATENT DOCUMENTS

| | | | | |
|---|---|---|---|---|
| 2003/0126439 | A1* | 7/2003 | Wheeler | H04L 63/0861 |
| | | | | 713/168 |
| 2005/0235154 | A1* | 10/2005 | Serret-Avila | G06F 21/53 |
| | | | | 713/176 |
| 2010/0031026 | A1* | 2/2010 | Cizas | G06F 21/76 |
| | | | | 713/169 |
| 2015/0052064 | A1* | 2/2015 | Karpenko | G06Q 20/3829 |
| | | | | 705/71 |
| 2015/0113278 | A1* | 4/2015 | Cocchi | H04L 63/0853 |
| | | | | 713/171 |
| 2015/0189506 | A1* | 7/2015 | Ying | H04W 12/04 |
| | | | | 726/7 |
| 2016/0164883 | A1 | 6/2016 | Li et al. | |
| 2016/0294828 | A1* | 10/2016 | Zakaria | H04W 12/06 |
| 2016/0352790 | A1 | 12/2016 | Hollingsworth et al. | |
| 2018/0324158 | A1* | 11/2018 | Brickell | H04L 63/102 |

OTHER PUBLICATIONS

"Notice of Allowance Issued in Chinese Patent Application No. 201880041786.8", dated Mar. 4, 2023, 4 Pages.

"Notice of Allowance Issued in European Patent Application No. 18731598.1", dated Mar. 20, 2023, 8 Pages.

"Final Office Action Issued in U.S. Appl. No. 15/629,064", dated Dec. 13, 2022, 25 Pages.

"Third Office Action Issued in Chinese Patent Application No. 201880041786.8", dated Dec. 23, 2022, 9 Pages.

"Non Final Office Action Issued in U.S. Appl. No. 15/629,064", dated Jun. 21, 2023, 26 Pages.

"Notice of Allowance Issued in European Patent Application No. 18731598.1", dated Jul. 27, 2023, 2 Pages.

* cited by examiner

CYBER PHYSICAL KEY

CROSS-REFERENCE TO RELATED APPLICATION PAPERS

This application is a continuation of U.S. application Ser. No. 15/703,857, filed on Sep. 13, 2017, entitled "Cyber Physical Key," which is incorporated herein by reference in its entirety.

BACKGROUND

"Cyber assets" refer to devices, systems, data, code, etc., whether tangible or intangible, for which the ability to control access configurations of the asset represents a type of "cyber ownership." Example cyber assets may include without limitation vehicles, computing devices, biological systems, real property, buildings, equipment, databases, data objects, etc. having cryptographically-controlled access configurations (e.g., controlled by a security system, a lock, and/or an access control list). Access configurations represent systems and/or electronic data records that control access to a cyber asset.

SUMMARY

Implementations described and claimed herein address the foregoing problems by providing a system to manage access to a cyber asset using a separate physical key device. Access to the cyber asset is controlled by an access configuration controller configured to access a memory storing a public cryptographic key as an unalterable record. The public cryptographic key is cryptographically paired with a private cryptographic key securely recorded in the separate physical key device. The access configuration controller receives an access control change instruction signed by the private cryptographic key of the separate physical key device and verifies a valid signing of the access control change instruction by the private cryptographic key using the public cryptographic key read from the memory. Access to the asset is managed according to one or more access authorization records recorded in a storage system secured by the access configuration controller. The access configuration controller alters the access authorization records according to the access control change instruction, responsive to verification of the valid signing of the access control change instruction by the private cryptographic key using the public cryptographic key.

Other implementations are also described and recited herein.

BRIEF DESCRIPTIONS OF THE DRAWINGS

DETAILED DESCRIPTIONS

A capability of controlling access configurations for a cyber asset allows a cyber owner to control which other entities can access and use the asset. Such ability also allows secure transfer of access configuration control, and therefore, secure transfer of cyber ownership, from one entity to another. Accordingly, by securing access configuration control with a cyber physical key device, physical transfer of the cyber physical key device from a first entity to a second entity results in secure transfer of cyber asset ownership from the first entity to the second entity.

Figure 1:
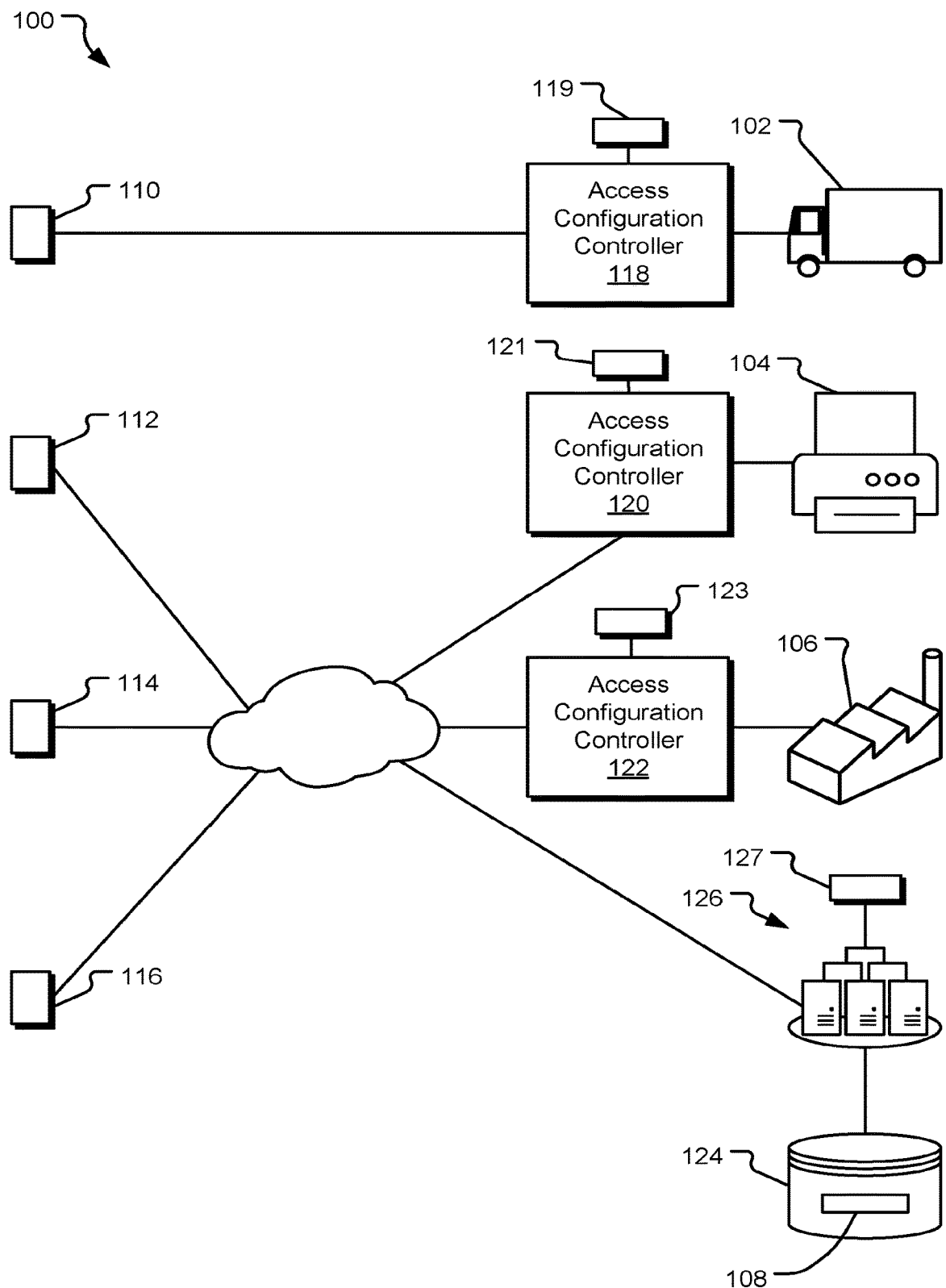
FIG. 1 illustrates an example system for controlling cyber ownership of four different cyber assets using cyber physical keys.

FIG. 1 illustrates an example system 100 for controlling cyber ownership of four different cyber assets 102, 104, 106, and 108 using cyber physical keys. In one implementation, the cyber physical keys are implemented as individual physical cryptographically-secure key devices 110, 112, 114, and 116 corresponding to each cyber asset 102, 104, 106, and 108, respectively. Each of physical cryptographically-secure key devices 110, 112, 114, and 116 securely stores a private cryptographic key. For example, each private cryptographic key may be securely recorded as an unalterable record in a physical trusted execution environment (TEE) device or a physical trusted platform module (TPM) device of a corresponding physical cryptographically-secure key device. The memory of the TEE device or TPM device may be implemented in various forms including without limitation one or more read-only-memory (ROM) devices, one or more write-once, read many (WORM) memory devices, and integrated circuits (ICs) in which the key is securely hard-wired in the IC itself. Example physical cryptographically-secure key devices may include without limitation contact and contactless smart cards, chip cards, hybrid cards, USB cards, and other secure devices.

Access to a cyber asset is controlled by a corresponding access configuration controller (see, e.g., access configuration controllers 118, 120, 122, and 126) using access authorization records (see, e.g., access authorization records 119, 121, 123, and 127) stored in a storage system secured by the access configuration controller. Each access authorization record may include without limitation identification and credentials of an access-authorized entity, a level of access, and constraints on access. As such, in one implementation, the access authorization records define credentials by which different entities are authorized to access the asset and access parameters defining how much access each entity is granted. In this manner, an access configuration controller controls access to the asset based on the corresponding access authorization records associated with the asset. Accordingly, by transferring physical possession of a cyber physical key (e.g., from a first owner's possession to a new owner's possession), cyber ownership of a cyber asset can be securely transferred to the new owner because the new owner can alter the access authorization records for the cyber asset.

Each access configuration controller also has access to a memory that stores a public cryptographic key as an unalterable record. The memory may be implemented in various forms including without limitation one or more read-onlymemory (ROM) devices, one or more write-once, read many (WORM) memory devices, and integrated circuits (ICs) in which the key is securely hard-wired in the IC itself. Accordingly, each private cryptographic key securely stored in a physical cryptographically-secure key device is cryptographically paired to a public cryptographic key stored in the memory accessible by a corresponding access configuration controller. As such, the cryptographic pairing of the secured private cryptographic key in the cyber physical key and the unalterable public cryptographic key in the memory of the access configuration controller enforces the binding of cyber asset ownership to the entity having physical possession of the corresponding cyber physical key.

In one implementation, a cyber physical key is configured to sign an access control change instruction using the corresponding private cryptographic key secured in the cyber physical key. The signed access control change instruction is then readable by or transmittable to an access configuration controller associated with a cyber asset. For example, an access control change instruction (e.g., from the cyber physical key) is signed by the private cryptographic key securely stored in the cyber physical key and can be read by the access configuration controller using radiofrequency (RF) induction. If the access configuration controller can verify that the access control change instruction is validly signed by the private cryptographic key of the corresponding cyber physical key, the access configuration controller can then grant the entity possessing the cyber physical key access to the access authorization records for the cyber asset. Such access then allows the entity to erase previous access authorization records and write new access authorization records of the entity's choosing. This change of access authorization records can constitute a change in cyber ownership because the physical possessor of the cyber physical key can control access to the cyber asset.

As previously described, each private cryptographic key corresponds to a public cryptographic key that is recorded as an unalterable record in a memory accessible to an access configuration controller of a corresponding cyber asset. In one implementation, an access configuration controller verifies that an access control change instruction from the cyber physical key is signed by a private cryptographic key corresponding to the public cryptographic key accessible by the access configuration controller. If such verification is successful, a validly-signed access control change instruction is processed by the access configuration controller to grant access to and/or control of a cyber asset in accordance with the instruction. For example, the access control change instruction may include a cryptographic policy that is executed by a TPM of the access configuration controller to grant the entity possessing the cyber physical key access to and/or control of the cyber asset. In one implementation, such new access and/or control is authorized via one or more access authorization records (e.g., the access configuration controller alters the access authorization records to deny access by the previously authorized entities and grants access by the new entity). Furthermore, the new entity, with the newly granted access, may make additional changes to the one or more authorization records to grant other employees, administrators, users, etc. access of some level or type (e.g., read and or write) to the cyber asset. An access authorization record may include without limitation one or more of identity information, credentials, access priorities, access permissions, access policies, cryptographic policies, public cryptographic keys, and private cryptographic keys. Depending on the contents of the access authorization record, it may be stored in cryptographically-secured memory (e.g., of a TEE) and/or in another storage system secured by the access configuration controller.

For example, if a first entity transfers ownership of a cyber asset 102 (e.g., a truck) to a second entity, the first entity transfers physical possession of the cyber physical key to the second entity (e.g., the new possessor). Thereafter, the second entity uses the cyber physical key to send an access control change instruction to the access configuration controller 118. The access configuration controller 118 then uses its unalterable public cryptographic key to verify that the access control change instruction was validly signed by the private cryptographic key of the cyber physical key. In this manner, the access configuration controller 118 can be instructed to grant the second entity access to delete previous access authorization records and to add a new access authorization record for the new entity (e.g., granting access authorization to the new owner). Accordingly, the new entity can establish cyber ownership of the cyber asset 102 because the new entity is the only entity recorded in the access authorization records that is authorized to make subsequent changes to the access authorization records (e.g., to authorize other entities, employees, etc. some level of access to and/or operational control of the asset.)

In one implementation, once the new entity has been granted access to the authorization records, the new entity can not only grant other entities some degree of access to or operation of the asset, but the new entity may also create new roles and operational limitation that may be attached to these roles. In the example of the cyber asset 102 being a vehicle, an example physical asset, the access configuration controller 118 and the access authorization records 119 may control access to a vehicle locking and/or ignition system, such that access to and/or operation of the cyber asset 102 is controlled by the access configuration controller 118. Different entities may even receive more limited permissions (e.g., the vehicle cannot be driven after dark by a particular entity) for the cyber asset.

In the example of the cyber asset 104 being a printer, an example physical asset, the access configuration controller 120 and the access authorization records 121 may control access to printer settings and/or use of the printer, such that access to and/or operation of the cyber asset 104 is controlled by the access configuration controller 120. In the example of the cyber asset 106 being a factory, an example physical asset, the access configuration controller 122 and the access authorization records 123 may control access to a security system, door locks, and/or factory system controls, such that access to and/or operation of the cyber asset 106 is controlled by the access configuration controller 122.

In the example of the cyber asset 108 being data in a database stored in data storage 124, the access configuration controller 126 may be embodied in a server system including various security subsystems. The access configuration controller 126 and the access authorization records 127 may control access to access control lists, network firewalls, and/or other data access interfaces, such that access to and/or operation of the cyber asset 108 is controlled by the access configuration controller 126.

Figure 2:
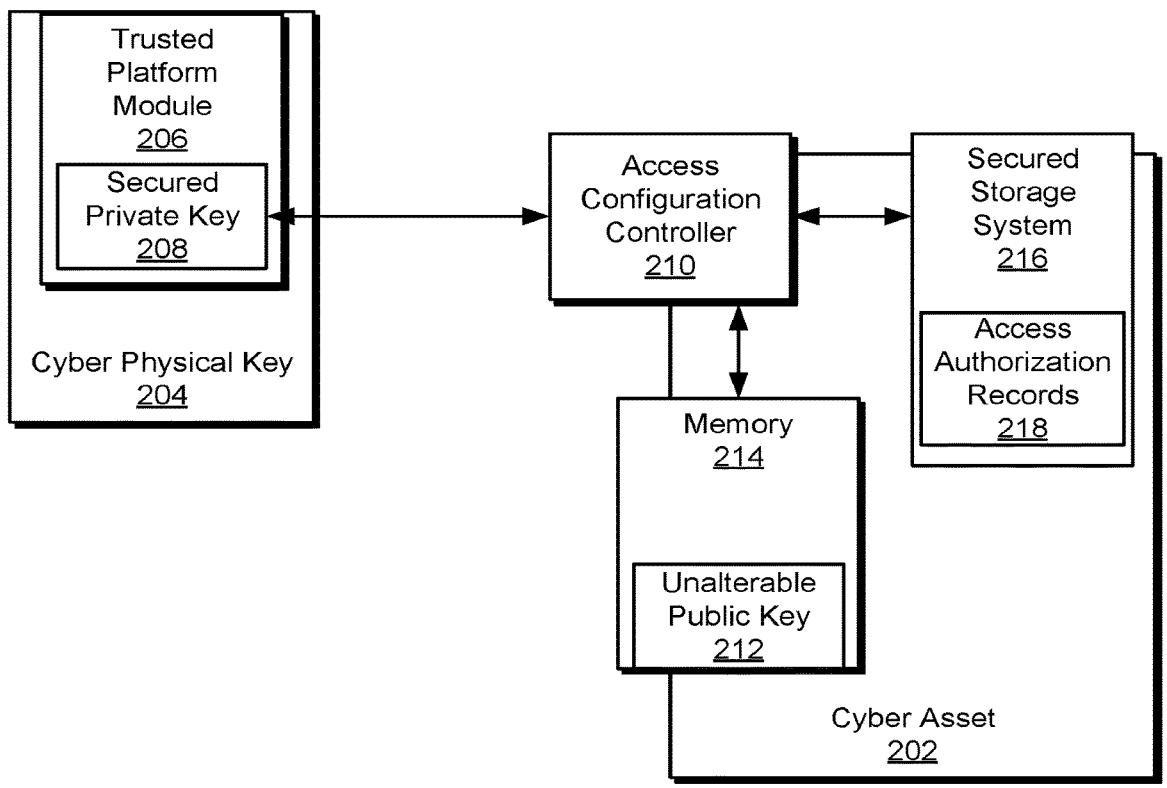
FIG. 2 illustrates an example system for controlling cyber ownership of a cyber asset using a public-private cryptographic key pair.

FIG. 2 illustrates an example system 200 for controlling cyber ownership of a cyber asset 202 using a public-private cryptographic key pair. A cyber physical key in the form of a physical cryptographically-secure key device 204 securely stores (e.g., in a trusted platform module (TPM) 206)) a private cryptographic key 208. The cyber physical key 204 is capable of communicating an access control change instruction that is signed by the private cryptographic key 208 to a corresponding access configuration controller 210.

The access configuration controller 210 accesses a public cryptographic key 212 stored as an unalterable record in memory 214 and uses the public cryptographic key 212 to verify that the access control change instruction was validly signed by the private cryptographic key 208 with which it was paired.

If the access configuration controller 210 verifies that the access control change instruction was validly signed, then the access configuration controller 210 grants access to access authorization records 218 in a secured storage system 216. In this manner, the entity possessing the cyber physical key 204 is granted access to the secured access authorization records 218, which it can modify for its own purposes as the cyber owner of the cyber asset 202.

Figure 3:
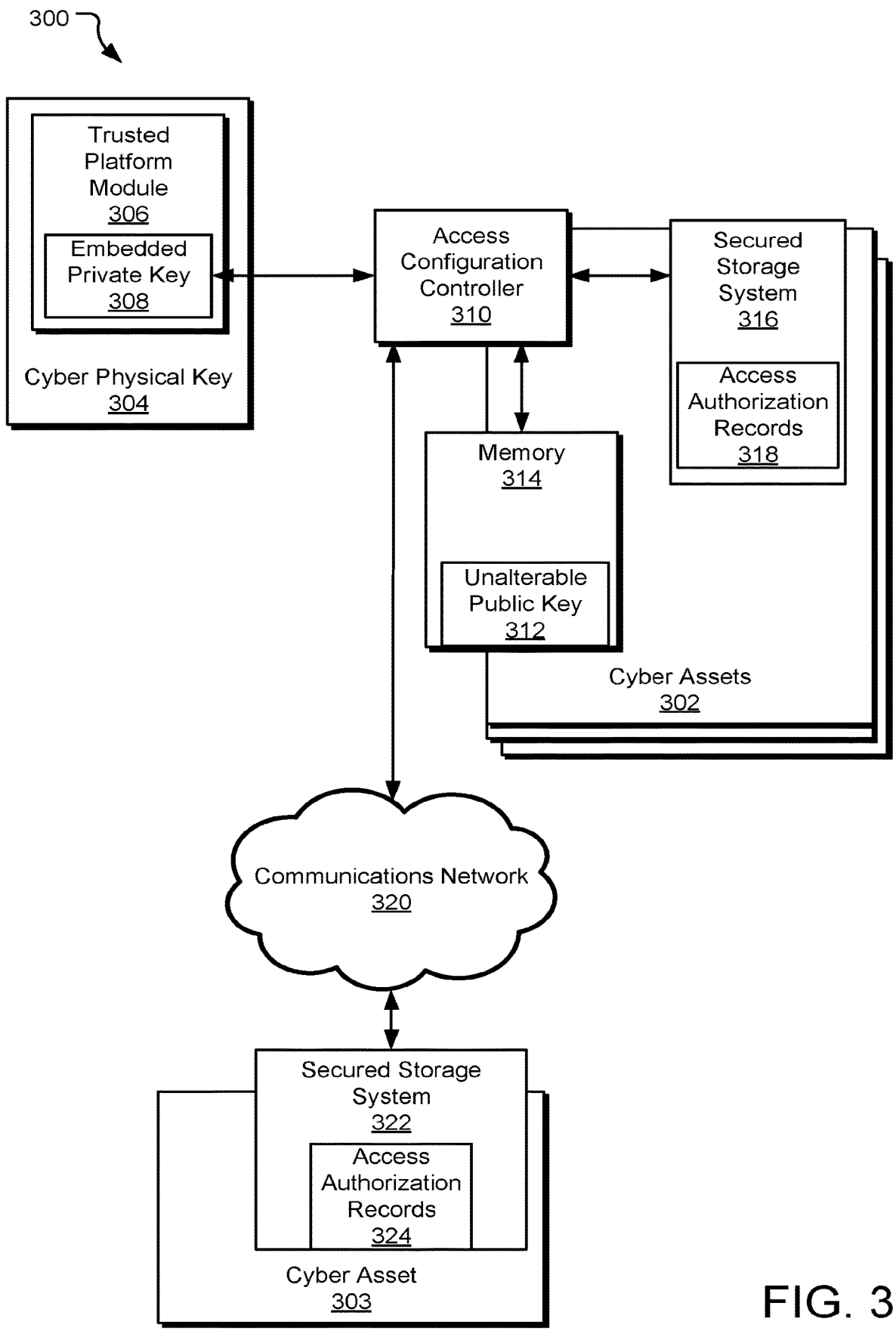
FIG. 3 illustrates an example system for controlling cyber ownership of multiple cyber assets using a public-private cryptographic key pair.

FIG. 3 illustrates an example system 300 for controlling cyber ownership of multiple cyber assets 302 and 303 using a public-private cryptographic key pair. A cyber physical key in the form of a physical cryptographically-secure key device 304 securely stores (e.g., in a trusted platform module (TPM) 306)) a private cryptographic key 308. The cyber physical key 304 is capable of communicating an access control change instruction that is signed by the private cryptographic key 308 to a corresponding access configuration controller 310. The access configuration controller 310 accesses a public cryptographic key 312 stored as an unalterable record in memory 314 and uses the public cryptographic key 312 to verify that the access control change instruction was validly signed by the private cryptographic key 308 with which it was paired.

If the access configuration controller 310 verifies that the access control change instruction was validly signed, then the access configuration controller 310 grants access to access authorization records 318 in a secured storage system 316. In this manner, the entity possessing the cyber physical key 304 is granted access to the secured access authorization records 318, which it can modify for its own purposes as the cyber owner of the cyber assets 302 and 303.

As shown in FIG. 3, the cyber assets 302 are represented as multiple assets communicatively connected locally to multiple distinct cyber assets. In addition or alternatively, the access configuration controller 310 can control access to access authorization records 324 via a communications network 320 in a remote secured storage system 322, wherein the access authorization records 324 control access to the cyber asset 303. In another implementation, access to both remote and local cyber assets can be controlled by local and/or remote access authorization records, depending on the desired configuration of the system 300. Accordingly, the access configuration controller 310 can control access to both local and remote cyber assets.

Figure 4:
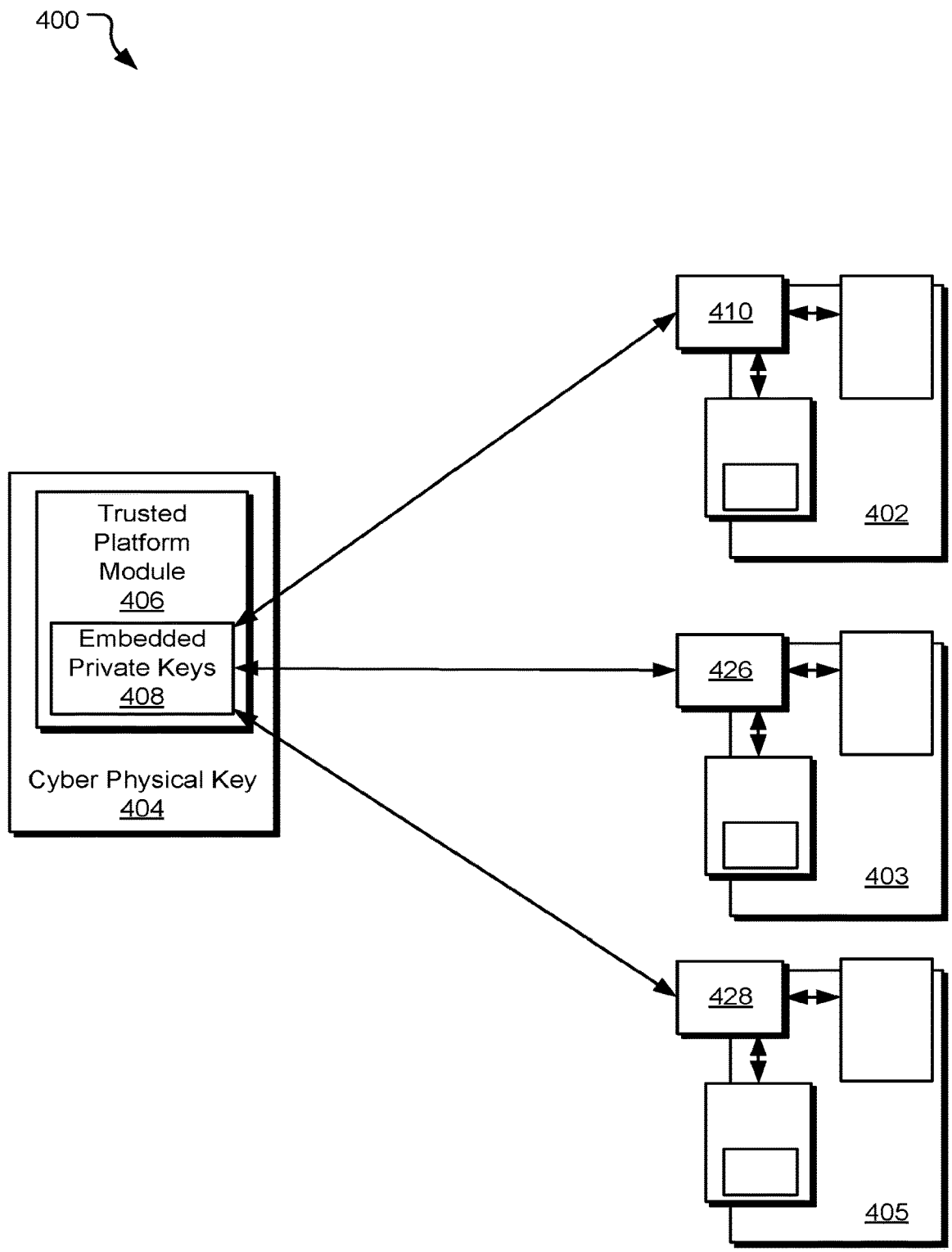
FIG. 4 illustrates an example system for controlling cyber ownership of multiple cyber assets using a public-private cryptographic key pair and multiple access configuration controllers.

FIG. 4 illustrates an example system 400 for controlling cyber ownership of multiple cyber assets 402, 403, and 405 using a public-private cryptographic key pair and multiple access configuration controllers 410, 426, and 428. A cyber physical key in the form of a physical cryptographically-secure key device 404 securely stores (e.g., in a trusted platform module (TPM) 406)) a private cryptographic key 408. The cyber physical key 404 is capable of communicating an access control change instruction that is signed by the private cryptographic key 408 to corresponding access configuration controllers 410, 426, and 428. The access configuration controllers 410, 426, and 428 access identical public cryptographic keys stored as unalterable records in memories accessible by each access configuration controller, each access configuration controller 410, 426, and 428 using a corresponding copy of the public cryptographic key to verify that the access control change instruction was validly signed by the private cryptographic key 408 with which the public cryptographic key was paired.

If the access configuration controllers 410, 426, and 428 verify that the access control change instruction was validly signed, then the access configuration controller 410 grants access to access authorization records in a storage system secured by each access configuration controller 410, 426, and 428. In this manner, the entity possessing the cyber physical key 404 is granted access to the secured access authorization records of each access configuration controller, which it can modify for its own purposes as the cyber owner of the cyber assets 402, 403, and 405.

Figure 5:
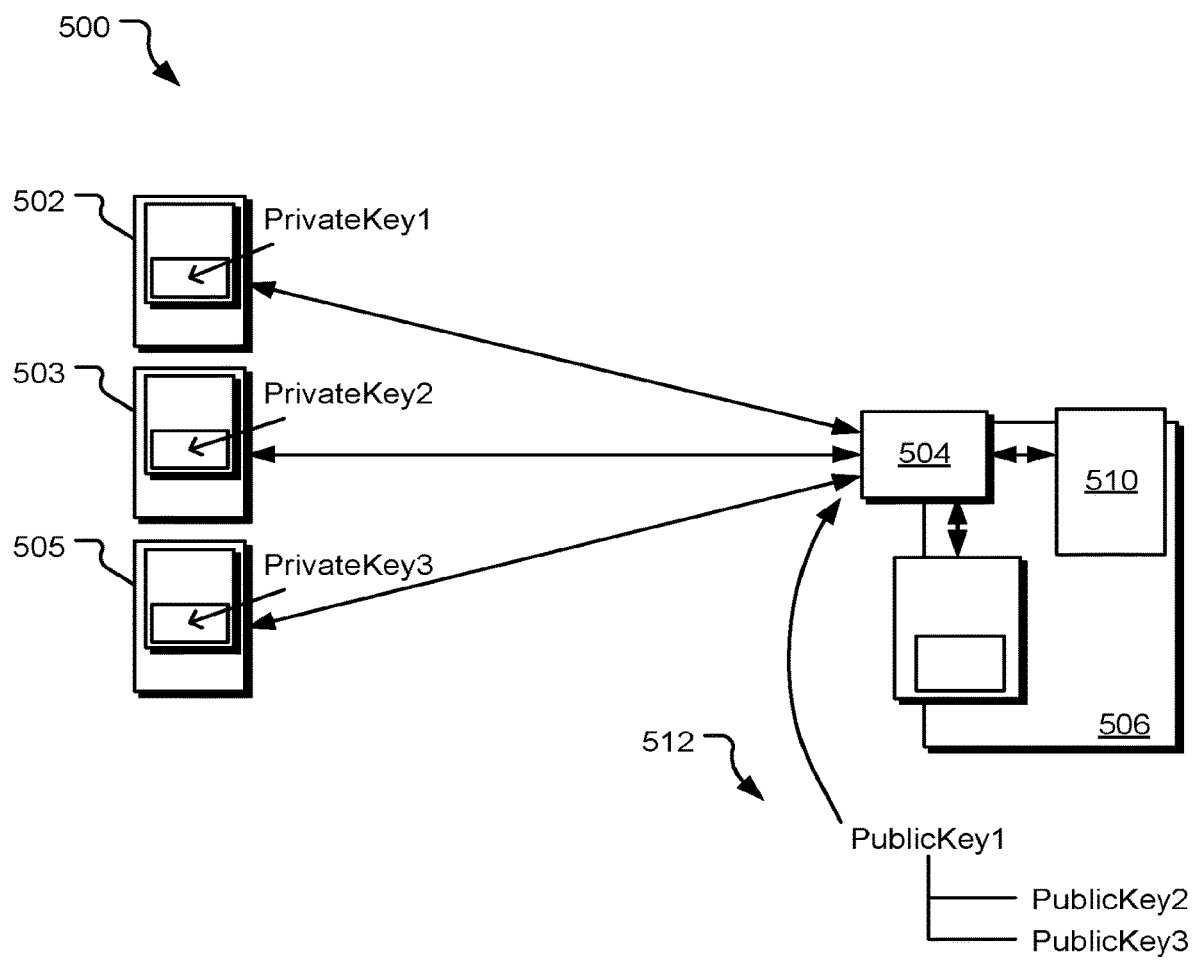
FIG. 5 illustrates an example system for controlling cyber ownership of one or more cyber assets using a hierarchy of public cryptographic key pairs.

FIG. 5 illustrates an example system 500 for controlling cyber ownership of one or more cyber assets 506 using a hierarchy 512 of public cryptographic key pairs. Multiple cyber physical keys in the form of physical cryptographically-secure key devices 502, 503, and 505 securely store (e.g., in trusted platform modules (TPMs)) private cryptographic keys. The physical cryptographically-secure key device 502 securely stores a PrivateKey1, the physical cryptographically-secure key device 503 securely stores a PrivateKey2, and physical cryptographically-secure key device 505 securely stores a PrivateKey3. The cyber physical keys are individually capable of communicating an access control change instruction that is signed by the respective private cryptographic key to an access configuration controller 504 that controls access to the one or more cyber assets 506. The access configuration controller 504 accesses the hierarchy 512 of (hierarchically-related) public cryptographic keys stored as unalterable records in a memory accessible by the access configuration controller 504. The access configuration controller 504 uses public cryptographic keys from the hierarchy 512 to verify that the access control change instruction was validly signed by a private cryptographic key from one of the cyber physical keys.

The hierarchy 512 allows cyber physical keys to be created that provide different types of access (e.g., degrees, scopes, priorities) to the one or more cyber assets 506. For example, the hierarchy 512 shows that hierarchy members PublicKey2 and PublicKey3 are subordinate to the hierarchy member PublicKey1 and therefore may provide a different priority of access control over the one or more cyber assets 506. In one implementation, the physical cryptographically-secure key device 502 may have been created as a "master key." Accordingly, the PublicKey1 corresponds to complete access to access authorization records 510 associated with the one or more cyber assets 506. In contrast, PublicKey2 and PublicKey3 correspond to more limited access, such as PublicKey2 corresponding to a subset of the cyber assets 506 and PublicKey3 corresponding to the another subset of the cyber assets 506, with neither public cryptographic key being able to override or change certain asset configuration records 510 set using the physical cryptographically-secure key device 502. Other access limitations and hierarchy configurations are also contemplated.

If the access configuration controller 504 verifies that the access control change instruction was validly signed (using any one of the public cryptographic keys of hierarchy 512), then the access configuration controller 504 grants a corresponding level of access to access authorization records 510 in a storage system secured by each access configuration controller 504. In this manner, the entity possessing the cyber physical key with PrivateKey1 is granted access to the secured access authorization records 510, which it can modify for its own purposes as the cyber owner of the cyber assets 506. In contrast, the cyber physical key with PrivateKey2 and the cyber physical key with PrivateKey3 provide a level of access that is subordinate to that associated with PrivateKey1.

In some implementations, an access configuration controller may also securely store its own private key, which it can use to communicate with authentication with a cyber physical key. In such configurations, through a communication sequence that includes a query about the cyber asset state, the access configuration controller can confirm that the asset is in a safe and/or undamaged state, prior to receiving and/or acting upon an access control change instruction to transfer ownership. For example, the cyber card may precede an access control change instruction with a status query, requesting the access configuration controller to run diagnostics on the cyber asset's subsystem and/or report back diagnostic results, safety status, etc. In this manner, the cyber asset transferee can obtain some assurances that the cyber asset remains safe and operational.

Figure 6:
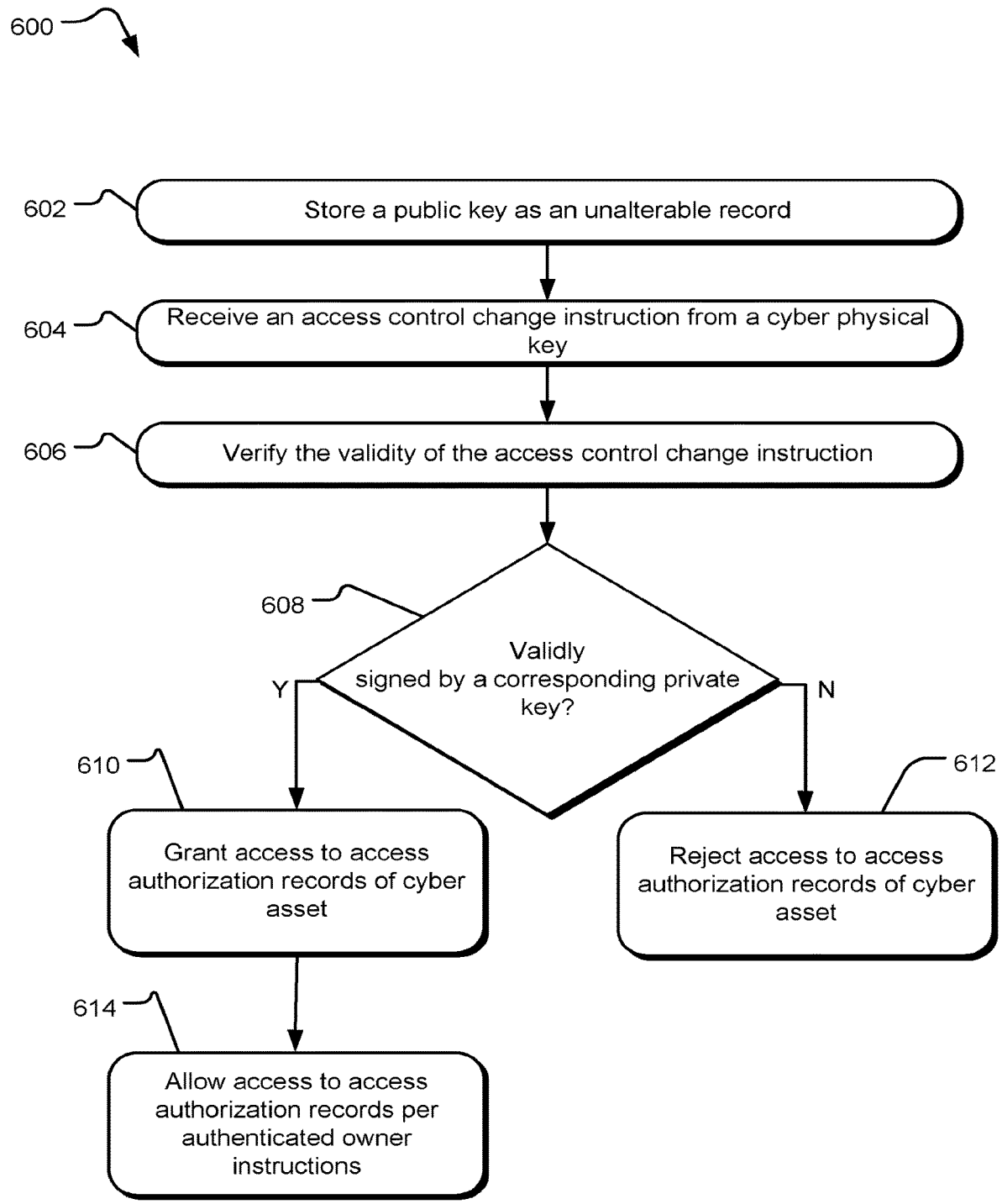
FIG. 6 illustrates example operations for controlling cyber ownership of a cyber asset.

FIG. 6 illustrates example operations 600 for controlling cyber ownership of a cyber asset. A storing operation 602 stores a public cryptographic key as an unalterable record in a memory accessible to an access configuration controller controlling access to secured access authorization records of a cyber asset. The public cryptographic key is cryptographically-paired with a private cryptographic key secured within a cyber physical key that can sign an access control change instruction with the private cryptographic key and communicate the signed instruction with the access configuration controller. The public cryptographic key may have been originally recorded as an unalterable record in memory by the manufacturer (e.g., in a ROM or integrated circuitry) or subsequently recorded by an owner, such as using a write-once, read many (WORM) memory.

A receiving operation 604 receives an access control change instruction from a cyber physical key. If the access control change instruction is valid, it will have been signed by a private cryptographic key that corresponds to the public cryptographic key stored as the unalterable record. A verification operation 606 verifies the validity of the access control change instruction by determining whether the access control change instruction was validly signed by the corresponding private encryption key, which is tested in an authentication operation 608.

If the authentication operation 608 determines that the access control change instruction was validly signed by the corresponding private encryption key, then an access grant operation 610 grants access by the authenticated cyber owner to the access authorization records associated with the cyber asset. Upon verification, an altering operation 614 allows access to access authorization records as instructed by the authenticated cyber owner of the corresponding cyber asset. In many instances, such access will result in an alteration of one or more access authorization records. If the authentication operation 608 determines that the access control change instruction was not validly signed by the corresponding private encryption key, then an access rejection operation 612 rejects access to the access authorization records associated with the cyber asset.

Figure 7:
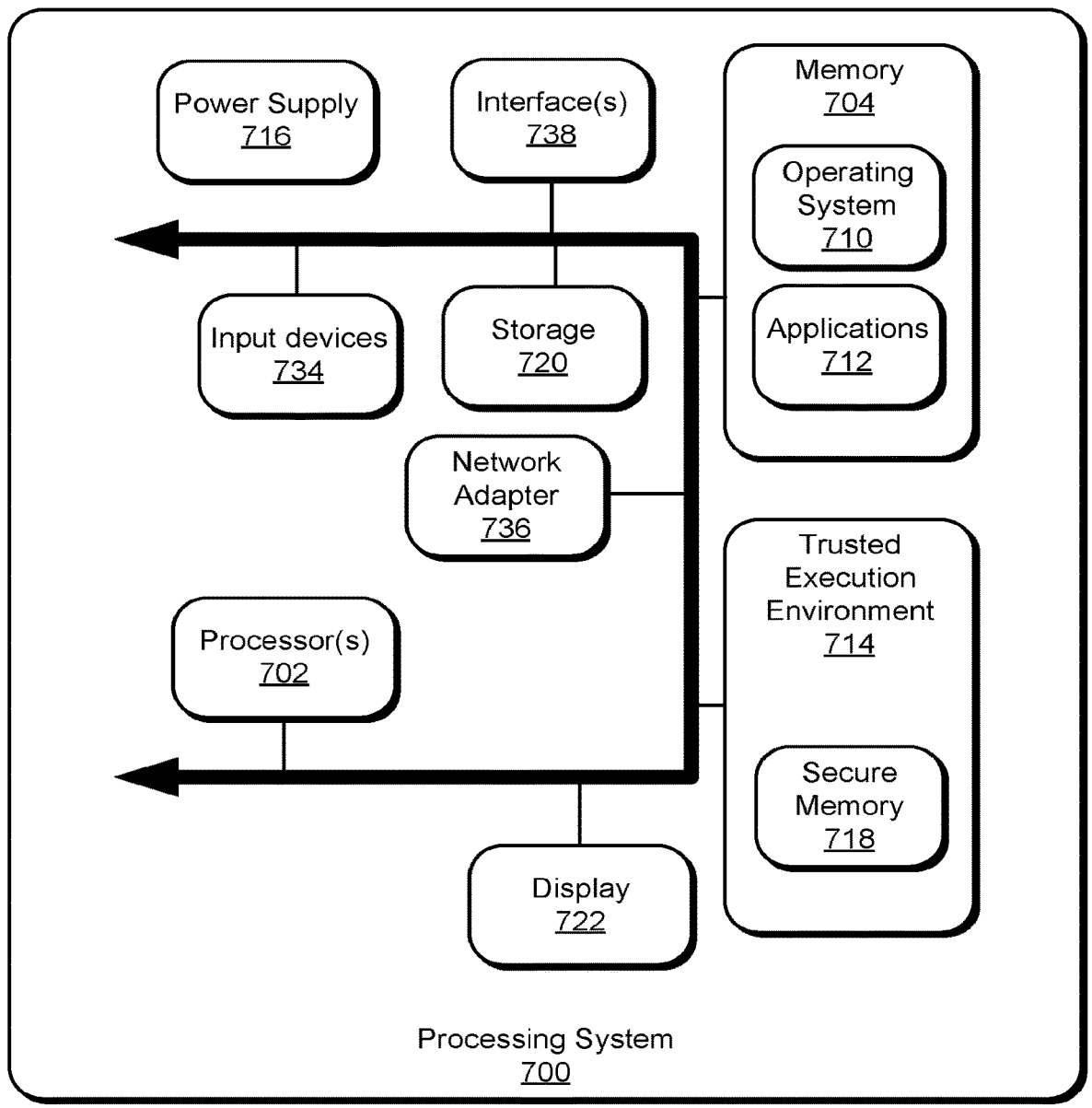
FIG. 7 illustrates an example system that may be useful in implementing the described technology.

FIG. 7 illustrates an example system (labeled as a processing system 700) that may be useful in implementing the described technology. The processing system may be a client device such as a laptop, mobile device, desktop, tablet, or a server/cloud device. The processing system 700 includes one or more processor(s) 702, and a memory 704. The memory 704 generally includes both volatile memory (e.g., RAM) and non-volatile memory (e.g., flash memory). An operating system 710 resides in the memory 704 and is executed by the processor(s) 702. The processing system 700 can also include a trusted execution environment (TEE) device 714 with secure memory 718. The secure memory 718 may be used to store, without limitation, access authorization records and/or cryptographic keys and may be implemented in various forms including without limitation one or more read-only-memory (ROM) devices, one or more write-once, read many (WORM) memory devices, and integrated circuits (ICs) in which the key is securely hard-wired in the IC itself.

One or more application programs 712 modules or segments, such as portions of a trusted execution environment 714 are loaded in the memory 704, the secure memory 718, and/or the storage 720 and executed by the processor(s) 702. Data such as cryptographic keys, access authorization records, access control change instructions, and access control parameters may be stored in the memory 704, the secure memory 718, or the storage 720 and may be retrievable by the processor(s) 702 for use managing access to a cyber asset. The storage 720 may be local to the processing system 700 or may be remote and communicatively connected to the processing system 700 and may include another server. The storage 720 may store resources that are requestable by client devices (not shown).

The processing system 700 includes a power supply 716, which is powered by one or more batteries or other power sources and which provides power to other components of the processing system 700. The power supply 716 may also be connected to an external power source that overrides or recharges the built-in batteries or other power sources.

The processing system 700 may include one or more network adapter 736 to provide network connectivity (e.g., mobile phone network, Wi-Fi®, Bluetooth®, etc.) to one or more other servers and/or client devices (e.g., mobile devices, desktop computers, or laptop computers). The processing system 700 may use the network adapter 736 and any other types of communication devices for establishing connections over a wide-area network (WAN) or local-area network (LAN). It should be appreciated that the network connections shown are exemplary and that other communications devices and means for establishing a communications link between the processing system 700 and other devices may be used.

The processing system 700 may include one or more input devices 734 such that a user may enter commands and information (e.g., a keyboard or mouse). These and other input devices may be coupled to the server by one or more interfaces 738 such as a serial port interface, parallel port, universal serial bus (USB), etc. The processing system 700 may further include a display 722 such as a touch screen display.

The processing system 700 may include a variety of tangible processor-readable storage media and intangible processor-readable communication signals. Tangible processor-readable storage can be embodied by any available media that can be accessed by the processing system 700 and includes both volatile and nonvolatile storage media, removable and non-removable storage media. Tangible processor-readable storage media excludes intangible communications signals and includes volatile and nonvolatile, removable and non-removable storage media implemented in any method or technology for storage of information such as processor-readable instructions, data structures, program modules or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the processing system 700. In contrast to tangible processor-readable storage media, intangible processor-readable communication signals may embody processor-readable instructions, data structures, program modules or other data resident in a modulated data signal, such as a carrier wave or other signal transport mechanism. The term "modulated data signal" means an intangible communications signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Some implementations may comprise an article of manufacture. An article of manufacture may comprise a tangible storage medium to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

An example method of managing access to an asset using a separate physical cryptographically-secure key device includes storing a public cryptographic key as an unalterable record in a memory accessible by an access configuration controller. The access configuration controller controls the access to the asset using the public cryptographic key. The public cryptographic key is cryptographically paired with a private cryptographic key securely recorded in the separate physical cryptographically-secure key device.

Another example method of any of the preceding methods includes receiving from the separate physical cryptographically-secure key device an access control change instruction signed by the private cryptographic key and verifying by the access configuration controller a valid signing of the access control change instruction by the private cryptographic key using the public cryptographic key read from the memory.

Another example method of any of the preceding methods is provided wherein access to the asset is managed according to one or more access authorization records stored in a storage system secured by the access configuration controller. The example method further includes allowing by the access configuration controller, access to the one or more access authorization records according to the access control change instruction, responsive to verification of the valid signing of the access control change instruction by the private cryptographic key using the public cryptographic key read from the memory.

Another example method of any of the preceding methods is provided wherein the asset includes data stored on one or more data stores.

Another example method of any of the preceding methods is provided wherein the asset includes one or more physical assets.

Another example method of any of the preceding methods is provided wherein the asset includes one or more physical assets and a security system configured to control access to the one or more physical assets.

Another example method of any of the preceding methods is provided wherein the public cryptographic key is secured with a trusted platform module of the access configuration controller.

Another example method of any of the preceding methods is provided wherein the private cryptographic key is secured with a trusted platform module of the separate physical cryptographically-secure key device.

Another example method of any of the preceding methods is provided wherein the public cryptographic key is a member of a hierarchically-related set of public cryptographic keys stored as unalterable records in the memory. Each public cryptographic key is cryptographically paired with a corresponding private cryptographic key securely recorded in the separate physical cryptographically-secure key device. Each cryptographic pairing corresponds to a grant of a different type of access compared to another cryptographic pairing in the hierarchically-related set.

An example system for managing access to an asset using a separate physical cryptographically-secure key device includes a memory storing a public cryptographic key as an unalterable record. An access configuration controller is coupled to the memory to read the public cryptographic key and is configured to control the access to the asset using the public cryptographic key. The public cryptographic key is cryptographically paired with a private cryptographic key securely recorded in the separate physical cryptographically-secure key device. The access configuration controller is operable to receive from the separate physical cryptographically-secure key device an access control change instruction signed by the private cryptographic key and to verify a valid signing of the access control change instruction by the private cryptographic key using the public cryptographic key read from the memory. A storage system is secured by the access configuration controller. One or more access authorization records are stored in the storage system and manages access to the asset. The access configuration controller is further operable to allow access to the one or more access authorization records in the storage system according to the access control change instruction, responsive to verification of the valid signing of the access control change instruction by the private cryptographic key using the public cryptographic key read from the memory.

Another example system of any of the preceding systems is provided wherein the asset includes data stored on one or more data stores.

Another example system of any of the preceding systems is provided wherein the asset includes one or more physical assets.

Another example system of any of the preceding systems further includes a trusted platform module device securing the public cryptographic key in the access configuration controller.

Another example system of any of the preceding systems is provided wherein the private cryptographic key is secured with a trusted platform module of the separate physical cryptographically-secure key device.

One or more tangible processor-readable storage media of a tangible article of manufacture encoding processor-executable instructions for executing on an electronic processing system provides an example process of managing access to an asset. The process includes storing a public cryptographic key as an unalterable record in a memory accessible by an access configuration controller. The access configuration controller controls the access to the asset using the public cryptographic key. The public cryptographic key is cryptographically paired with a private cryptographic key securely recorded in a separate physical cryptographically-secure key device.

The one or more tangible processor-readable storage media of any preceding storage media provides an example process further includes receiving from the separate physical cryptographically-secure key device an access control change instruction signed by the private cryptographic key and verifying a valid signing of the access control change instruction by the private cryptographic key using the public cryptographic key read from the memory.

The one or more tangible processor-readable storage media of any preceding storage media provides an example process wherein access to the asset is managed according to one or more access authorization records stored in a storage system secured by the access configuration controller. The example process further includes allowing access to the one or more access authorization records according to the access control change instruction, responsive to verification of the valid signing of the access control change instruction by the private cryptographic key using the public cryptographic key read from the memory.

The one or more tangible processor-readable storage media of any preceding storage media provides an example process wherein the public cryptographic key is secured with a trusted platform module of the access configuration controller.

The one or more tangible processor-readable storage media of any preceding storage media provides an example process wherein the private cryptographic key is secured with a trusted platform module of the separate physical cryptographically-secure key device.

The one or more tangible processor-readable storage media of any preceding storage media provides an example process wherein the public cryptographic key is a member of a hierarchically-related set of public cryptographic keys stored as unalterable records in the memory. Each public cryptographic key is cryptographically paired with a corresponding private cryptographic key securely recorded in the separate physical cryptographically-secure key device. Each cryptographic pairing corresponds to a grant of a different type of access compared to another cryptographic pairing in the hierarchically-related set.

An example system for managing access to an asset using a separate physical cryptographically-secure key device includes means for storing a public cryptographic key as an unalterable record in a memory accessible by an access configuration controller. The access configuration controller controls the access to the asset using the public cryptographic key. The public cryptographic key is cryptographically paired with a private cryptographic key securely recorded in the separate physical cryptographically-secure key device.

Another example system of any of the preceding systems includes means for receiving from the separate physical cryptographically-secure key device an access control change instruction signed by the private cryptographic key and means for verifying by the access configuration controller a valid signing of the access control change instruction by the private cryptographic key using the public cryptographic key read from the memory.

Another example system of any of the preceding systems is provided wherein access to the asset is managed according to one or more access authorization records stored in a storage system secured by the access configuration controller. The example system further includes means for allowing by the access configuration controller, access to the one or more access authorization records according to the access control change instruction, responsive to verification of the valid signing of the access control change instruction by the private cryptographic key using the public cryptographic key read from the memory.

Another example system of any of the preceding systems is provided wherein the asset includes data stored on one or more data stores.

Another example system of any of the preceding systems is provided wherein the asset includes one or more physical assets.

Another example system of any of the preceding systems is provided wherein the asset includes one or more physical assets and a security system configured to control access to the one or more physical assets.

Another example system of any of the preceding systems is provided wherein the public cryptographic key is secured with a trusted platform module of the access configuration controller.

Another example system of any of the preceding systems is provided wherein the private cryptographic key is secured with a trusted platform module of the separate physical cryptographically-secure key device.

Another example system of any of the preceding systems is provided wherein the public cryptographic key is a member of a hierarchically-related set of public cryptographic keys stored as unalterable records in the memory. Each public cryptographic key is cryptographically paired with a corresponding private cryptographic key securely recorded in the separate physical cryptographically-secure key device. Each cryptographic pairing corresponds to a grant of a different type of access compared to another cryptographic pairing in the hierarchically-related set.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

What is claimed is:

1. A system comprising:
a processor; and
a memory communicatively coupled to the processor and storing computer-executable instructions that, when executed by the processor, perform operations comprising:
providing, by a cyber key device, an access control change instruction to an access configuration controller of an asset, the access control change instruction being signed by a private cryptographic key stored by the cyber key device, the private cryptographic key being secured using a trusted environment mechanism of the cyber key device; and
based on the access control change instruction, receiving, by the cyber key device, access to a first access authorization record for the asset, the first access authorization record being stored in a storage system secured by the access configuration controller and defining credentials authorizing access to the asset, the access configuration controller storing a public cryptographic key controlling access to the first access authorization record as an unalterable memory record.

2. The system of claim 1, wherein the private cryptographic key is cryptographically paired with the public cryptographic key.

3. The system of claim 1, the operations further comprising:
providing, by the cyber key device, a modification to the first access authorization record, the modification altering a credential for accessing the asset.

4. The system of claim 1, the operations further comprising:
providing, by the cyber key device, a second access authorization record for the asset, the second access authorization record creating a new credential for accessing the asset.

5. The system of claim 4, wherein the second access authorization record represents a change in ownership of the asset from a first entity to a second entity.

6. The system of claim 1, the operations further comprising:
providing, by the cyber key device, an access request for the asset to the access configuration controller; and
receiving access to the asset based on the first access authorization record.

7. The system of claim 1, wherein the trusted environment mechanism:
stores the private cryptographic key as an unalterable memory record; and
corresponds to a trusted execution environment or a trusted platform module.

8. The system of claim 1, wherein the asset corresponds to at least one of:
an automobile;
a building; or
a biological system.

9. A method comprising:
providing, by a cyber key device, an access control change instruction to an access configuration controller associated with a plurality of assets, the access control change instruction being signed by a private cryptographic key stored by the cyber key device, the private cryptographic key being secured using a trusted platform mechanism of the cyber key device; and
based on the access control change instruction, receiving, by the cyber key device, access to an access authorization record for an asset of the plurality of assets, the access authorization record being stored in a storage system secured by the access configuration controller and defining credentials authorizing access to the asset, the access configuration controller storing a public cryptographic key controlling access to the access authorization record as an unalterable memory record.

10. The method of claim 9, wherein each asset of the plurality of assets is co-located with the access configuration controller.

11. The method of claim 9, wherein at least one asset of the plurality of assets is located remotely from the access configuration controller.

12. The method of claim 9, wherein the storage system stores an access authorization record for each asset of the plurality of assets.

13. The method of claim 9, wherein a first asset of the plurality of assets is a first asset type and a second asset of the plurality of assets is a second asset type that is different from the first asset type.

14. The method of claim 9, the method further comprising:
providing, by the cyber key device, a modification of the access authorization record, the modification altering the credentials for the asset.

15. The method of claim 14, wherein altering the credentials for the asset does not cause credentials for other assets of the plurality of assets to be altered.

16. A cyber key device comprising:
a processor; and
a memory communicatively coupled to the processor and storing computer-executable instructions that, when executed by the processor, perform operations comprising:
providing a first access control change instruction to a first access configuration controller of a first asset, the first access control change instruction being signed by a private cryptographic key stored by the cyber key device, the private cryptographic key being secured using a trusted environment mechanism of the cyber key device;
providing a second access control change instruction to a second access configuration controller of a second asset, the second access control change instruction being signed by the private cryptographic key;
receiving access to a first access authorization record for the first asset, the first access authorization record defining first credentials authorizing access to the first asset, the first access configuration controller storing a first public cryptographic key controlling access to the first access authorization record as an unalterable memory record; and
receiving access to a second access authorization record for the second asset, the second access authorization record defining second credentials authorizing access to the second asset.

17. The cyber key device of claim 16, wherein the second access configuration controller stores a second public cryptographic key that is identical to the first public cryptographic key, the second public cryptographic key being paired to the private cryptographic key.

18. The cyber key device of claim 16, the operations further comprising:
　　updating ownership of the first asset to an entity by providing a first ownership update instruction to the first access configuration controller; and
　　updating ownership of the second asset to the entity by providing a second ownership update instruction to the second access configuration controller.

19. The cyber key device of claim 16, wherein the first asset and the second asset each correspond to at least one of:
　　a computing device; or
　　real property.

20. The cyber key device of claim 16, wherein the first asset is stored in a same location as the second asset.

* * * * *